(12) United States Patent
Kikkawa

(10) Patent No.: US 9,253,429 B2
(45) Date of Patent: Feb. 2, 2016

(54) VIDEO IMAGE PROCESSING APPARATUS AND METHOD FOR CONTROLLING VIDEO IMAGE PROCESSING APPARATUS

(75) Inventor: Teruki Kikkawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1101 days.

(21) Appl. No.: 13/322,893

(22) PCT Filed: Apr. 13, 2010

(86) PCT No.: PCT/JP2010/056894
§ 371 (c)(1),
(2), (4) Date: Nov. 28, 2011

(87) PCT Pub. No.: WO2010/140430
PCT Pub. Date: Dec. 9, 2010

(65) Prior Publication Data
US 2012/0075438 A1 Mar. 29, 2012

(30) Foreign Application Priority Data
Jun. 3, 2009 (JP) .................................. 2009-134298

(51) Int. Cl.
*H04N 5/44* (2011.01)
*G09G 3/00* (2006.01)
(Continued)

(52) U.S. Cl.
CPC .................. *H04N 5/44* (2013.01); *G09G 3/003* (2013.01); *G09G 3/007* (2013.01); *G09G 5/00* (2013.01);
(Continued)

(58) Field of Classification Search
CPC .................. G09G 2320/046; G09G 2320/106; G09G 2340/0464; G09G 3/003; G09G 3/007; G09G 5/00; H04N 21/431; H04N 21/44; H04N 21/816; H04N 5/44
See application file for complete search history.

(56) References Cited

U.S. PATENT DOCUMENTS 5,541,642 A * 7/1996 Ashbey ............................ 348/59
5,717,415 A * 2/1998 Iue et al. ............................ 345/8
(Continued)

FOREIGN PATENT DOCUMENTS

CN 1774735 A 5/2006
CN 1801269 A 7/2006
(Continued)

OTHER PUBLICATIONS

Chinese Office Action issued in corresponding application No. 201080024839.9 on Nov. 4, 2014.
(Continued)

*Primary Examiner* — Sath V Perungavoor
*Assistant Examiner* — Peter D Le
(74) *Attorney, Agent, or Firm* — Carter, DeLuca, Farrell & Schmidt, LLP

(57) ABSTRACT

There is provided a video image processing apparatus. A display device includes a first display portion for a left eye image and a second display portion for a right eye image. The apparatus comprises: video image processing means for cutting out a part of frame images from a three-dimensional video image configured as an aggregate of the frame images, a single frame image being formed by arranging a pair of a left and right eye images corresponding to the same scene in a prescribed pattern; and output means for outputting the partial image to the display device. The video image processing means, when changing the cutout position, cuts out the partial image such that an arrangement pattern of the left and right eye images in the partial image after the change matches an arrangement pattern of the first and the second display portions in the display region.

14 Claims, 7 Drawing Sheets

(51) Int. Cl.
  *G09G 5/00* (2006.01)
  *H04N 21/431* (2011.01)
  *H04N 21/44* (2011.01)
  *H04N 21/81* (2011.01)

(52) U.S. Cl.
  CPC .......... *H04N 21/431* (2013.01); *H04N 21/44* (2013.01); *H04N 21/816* (2013.01); *G09G 2320/046* (2013.01); *G09G 2320/106* (2013.01); *G09G 2340/0464* (2013.01)

(56) References Cited

U.S. PATENT DOCUMENTS

| | | | | |
|---|---|---|---|---|
| 5,786,848 | A * | 7/1998 | Isobe et al. | 348/51 |
| 6,075,556 | A * | 6/2000 | Urano et al. | 348/43 |
| 6,549,295 | B1 * | 4/2003 | Fantone et al. | 358/1.14 |
| 2002/0009137 | A1 | 1/2002 | Nelson et al. | |
| 2006/0001601 | A1 * | 1/2006 | Ono | 345/60 |
| 2006/0209054 | A1 | 9/2006 | Someya et al. | |
| 2007/0096767 | A1 * | 5/2007 | Tsai | 324/770 |
| 2010/0039428 | A1 * | 2/2010 | Kim et al. | 345/419 |
| 2010/0171817 | A1 * | 7/2010 | Tourapis et al. | 348/51 |
| 2010/0328428 | A1 * | 12/2010 | Booth et al. | 348/46 |

FOREIGN PATENT DOCUMENTS

| | | |
|---|---|---|
| EP | 1555814 A2 | 7/2005 |
| EP | 1679683 A | 7/2006 |
| JP | 2000-338947 A | 12/2000 |
| JP | 2004-264366 A | 9/2004 |
| JP | 2004-267442 A | 9/2004 |
| JP | 2006-013913 A | 1/2006 |
| WO | 2008/150111 A | 12/2008 |
| WO | 2008/150111 A1 | 12/2008 |

OTHER PUBLICATIONS

Japanese Office Action dated Sep. 28, 2012 for corresponding application No. 2009-134298.

* cited by examiner

Lx : POLARIZATION FOR LEFT EYE
Rx : POLARIZATION FOR RIGHT EYE

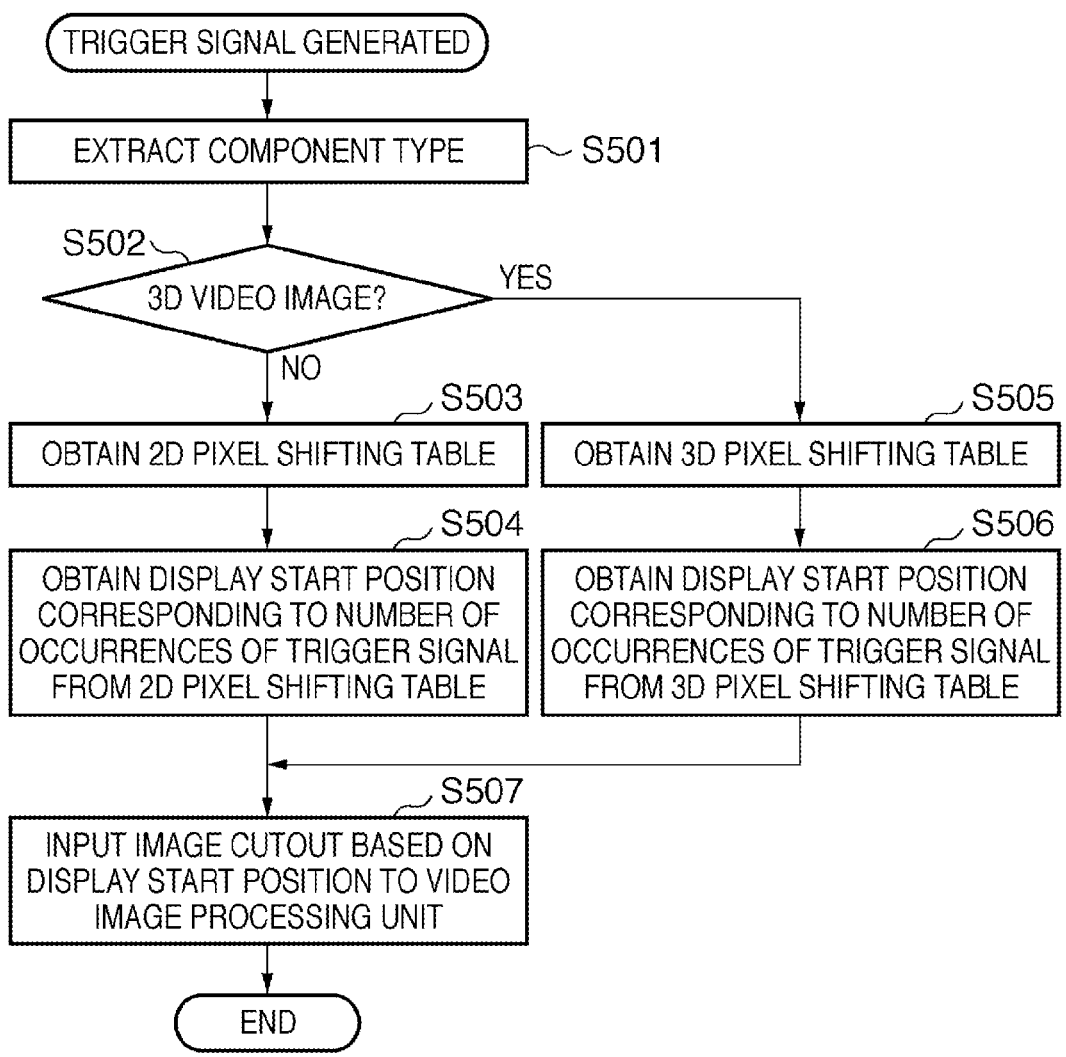

VIDEO IMAGE PROCESSING APPARATUS AND METHOD FOR CONTROLLING VIDEO IMAGE PROCESSING APPARATUS

TECHNICAL FIELD

The present invention relates to a video image processing apparatus and a method for controlling a video image processing apparatus.

BACKGROUND ART

Currently, three-dimensional (3D) video images are broadcasted (3D broadcasting). For example, the channel BS 11, which is a Japanese digital satellite broadcasting channel, performs 3D broadcasting by the "side-by-side method" in which a video image for a single screen is transmitted by dividing the image into a left eye video image and a right eye video image. In addition, the "polarization method" and the "active shutter method" are known as typical display methods for 3D video images. The active shutter method is also referred to as the time-division display method, the frame sequential method or the like.

In the case of the polarization method, a receiver for 3D broadcasts includes a film having polarization properties on a display panel, and carries out an interlaced display of left eye video images and right eye video images. A viewer wears polarization glasses and views the display lines for the left eye video images with his/her left eye, and views the display lines for the right eye video images with his/her right eye, thereby enabling stereoscopic perception of video images.

In the case of the active shutter method, the 3D broadcasting receiver alternately displays left eye video images and right eye video images. A viewer wears glasses including a liquid-crystal shutter. The glasses control the liquid-crystal shutter such that the left eye video image enters his/her left eye only and the right eye video image enters his/her right eye only. In this manner, a viewer can perceive video images stereoscopically.

Incidentally, a phenomenon called burn-in may occur on a display panel. Burn-in is a phenomenon in which degradation of light-emitting devices advances due to lighting the light-emitting devices for a long time, leading to a condition in which its light-emitting function is not performed properly. Especially, in the case where a still image or a moving image including a still region is displayed for a long time, such an image may sometimes remain on the display panel like an afterimage due to burn-in.

In this manner, burn-in is caused by degradation of the light-emitting devices, and may occur both with two-dimensional (2D) video images and 3D video images. Some techniques for suppressing burn-in from occurring are currently known.

Japanese Patent Laid-Open No. 2000-338947 discloses a technique for mitigating burn-in by the method so-called "pixel shifting", which, when an input image does not change for a certain amount of time, changes the display size of the image to shift the display position thereof.

Japanese Patent Laid-Open No. 2004-264366 discloses a technique in which the input format of an image is detected and interpolation is carried out in accordance with the display size. Then, burn-in is mitigated by shifting, by one pixel per prescribed amount of time, the display position of the image in horizontal and vertical directions within a prescribed pixel range, while suppressing visual distractions caused by the shifting of the image.

Japanese Patent Laid-Open Nos. 2000-338947 and 2004-264366 aim at applying a pixel shifting to 2D video images, but do not give consideration to the case that video images include left eye video images and right eye video images. Nevertheless, when processing such as conventional pixel shifting is applied to 3D video images, there is a possibility that the 3D video image is perceived with a different stereoscopic effect from that originally intended by the creator thereof, due to the following reasons.

For example, in the case of the polarization method, if the pixels for the left eye video image are shifted to the positions of the pixels for the right eye video image and, the pixels for the right eye video image are shifted to the positions of the pixels for the left eye video image, the parallax between the right and left eyes is inverted. Also in the case of the active shutter method, the parallax between both video images fluctuates when the shift amount of the pixels for the left eye video image and that for the right eye video image are different from each other, or when the shift timings for the pixels for these video images are different from each other. In the 3D video image, people can perceive video images stereoscopically by providing parallax (binocular parallax) between the left eye video image and the right eye video image. However, as a result of the parallax based on which a video image is designed being changed due to a burn-in control, it is anticipated that the 3D video image becomes blurred, or in a worse case, fails to be perceived as a 3D video image. That is, conventional burn-in mitigation techniques have not given consideration to the issue of burn-in in the 3D video images.

SUMMARY OF INVENTION

The present invention has been achieved in consideration of these circumstances, and provides a technique for mitigating burn-in for 3D video images.

According to the first aspect of the present invention, there is provided a video image processing apparatus that outputs a video image to a display device having a display region including a first display portion for displaying a left eye image and a second display portion for displaying a right eye image, comprising: video image processing means for cutting out a part of frame images from a three-dimensional video image configured as an aggregate of the frame images for each scene, a single frame image being formed by arranging a pair of a left eye image and a right eye image corresponding to the same scene in a prescribed pattern; and output means for outputting the partial image cut out by the video image processing means to the display device, wherein the video image processing means, when changing the cutout position of the partial image, cuts out the partial image from the frame images such that an arrangement pattern of the left eye image and the right eye image in the partial image after the cutout position is changed matches an arrangement pattern of the first display portion and the second display portion in the display region.

According to the second aspect of the present invention, there is provided a video image processing apparatus that outputs a video image to a display device, comprising: video image processing means for cutting out a part of a left eye frame image and a right eye frame image from a three-dimensional video image configured as an aggregate of left and right frame image sets for each scene, a single left and right frame image set being formed of a pair of a left eye frame image and a right eye frame image corresponding to the same scene, and output means for outputting the partial image cut out by the video image processing means to the display device, wherein the video image processing means executes processing for changing a cutout position of the partial image, and the video image processing means executes the processing for changing the cutout position at a timing in which, in the three-dimensional video image, a left and right frame image set corresponding to the same scene is switched to the next left and right frame image set.

According to the third aspect of the present invention, there is provided a method for controlling a video image processing apparatus that outputs a video image to a display device having a display region including a first display portion for displaying a left eye image and a second display portion for displaying a right eye image, comprising: a video image processing step of cutting out a part of frame images from a three-dimensional video image configured as an aggregate of the frame images for each scene, a single frame image being formed by arranging a pair of a left eye image and a right eye image corresponding to the same scene in a prescribed pattern; and an outputting step of outputting the partial image cut out in the video image processing step to the display device, wherein in the video image processing step, when changing the cutout position of the partial image, the partial image is cut out from the frame image such that an arrangement pattern of the left eye image and the right eye image in the partial image after the cutout position is changed matches an arrangement pattern of the first display portion and the second display portion in the display region.

According to the forth aspect of the present invention, there is provided a method for controlling a video image processing apparatus that outputs a video image to a display device, comprising: a video image processing step of cutting out a part of a left eye frame image and a right eye frame image from a three-dimensional video image configured as an aggregate of right and left frame image sets for each scene, a single right and left frame image set being formed of a pair of a left eye frame image and a right eye frame image corresponding to the same scene, and an outputting step of outputting the partial image cut out in the video image processing step to the display device, wherein in the video image processing step, processing for changing a cutout position of the partial image is executed, and in the video image processing step, the processing for changing the cutout position is executed at a timing in which, in the three-dimensional video image, a left and right frame image set corresponding to the same scene is switched to the next left and right frame image set.

With the above configuration, the present invention can provide a technique for mitigating burn-in for 3D video images.

Further features of the present invention will become apparent from the following description of exemplary embodiments with reference to the attached drawings.

BRIEF DESCRIPTION OF DRAWINGS

FIG. 4 is a conceptual diagram of a 2D pixel shifting table and a 3D pixel shifting table.

FIG. 5 is a flowchart illustrating burn-in mitigation processing by the broadcast receiver 300.

DESCRIPTION OF EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

In the following embodiments, a case is described in which a video image processing apparatus of the present invention is applied to a broadcast receiver, however, application examples are not limited thereto. It is also possible to apply a video image processing apparatus of the present invention to a video image reproduction apparatus, such as DVD player for example.

First Embodiment

Figure 1:
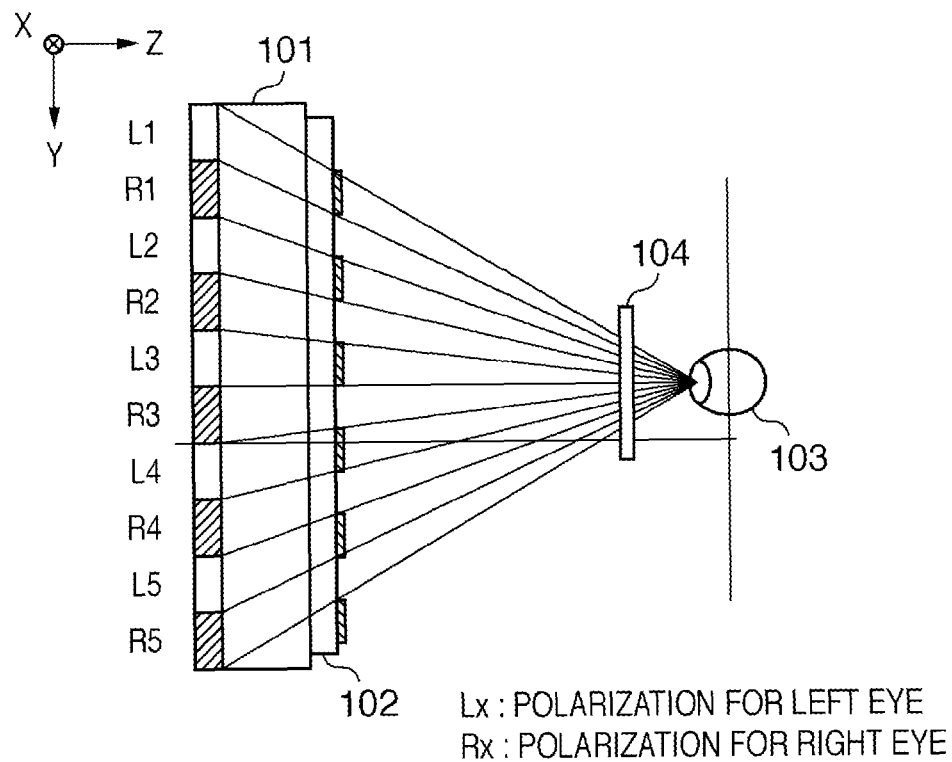
FIG. 1 is a conceptual diagram showing a display panel 101 as viewed from the side that displays a 3D video image by a polarization method.
Figure 2:
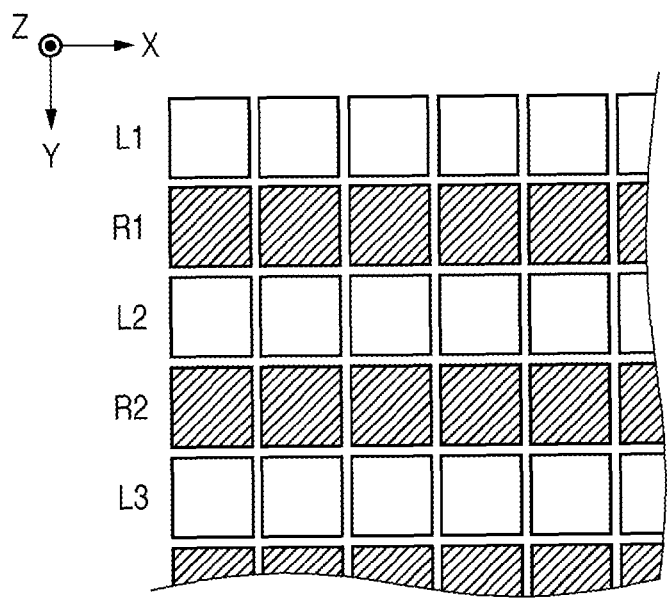
FIG. 2 is a conceptual diagram showing the display panel 101 as viewed from the front.

In the first embodiment, a case is described in which the polarization method is used as the display method for three-dimensional video images (3D video images). Accordingly, the 3D video image is constituted as an aggregate of pairs of a left eye image and a right eye image corresponding to the same scene. FIG. 1 is a conceptual diagram showing a display panel 101 as viewed from the side that displays the 3D video image by the polarization method. FIG. 2 is a conceptual diagram showing the display panel 101 as viewed from the front.

The display panel 101 receives and displays video images output by a broadcast receiver. The display panel 101 may be of any type, such as a liquid crystal display, a plasma display, or an SED (Surface-conduction Electron-emitter Display).

A polarization filter 102 is attached on the display panel 101 (display device). As shown in FIG. 2, the polarization filter 102 is configured such that odd numbered lines (L1, L2, . . . ) serve as left eye display lines (first display portion), and even numbered lines (R1, R2, . . . ) serve as right eye display lines (second display portion). Therefore, left eye images and right eye images are respectively displayed with light having different oscillation directions. The viewer (user) perceives a video image as a 3D video image by viewing the video image while wearing special polarization glasses 104 in which polarization filters with different orientations are used respectively for the left eye and the right eye (FIG. 1 shows only one of the eyes, 103).

Figure 3:
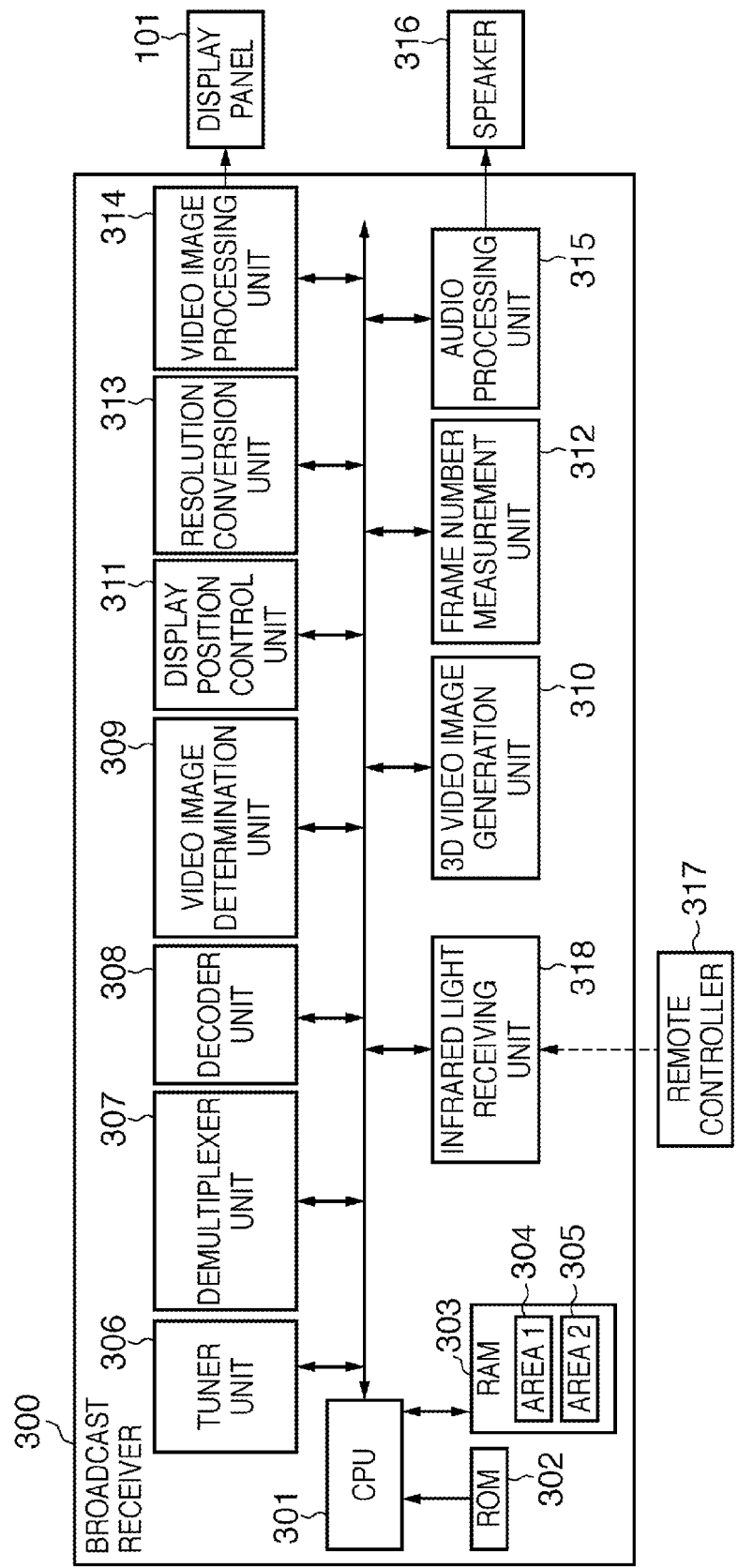
FIG. 3 is a block diagram showing the schematic configuration of a broadcast receiver 300 according to a first embodiment.

FIG. 3 is a block diagram showing a schematic configuration of a broadcast receiver 300 according to a first embodiment. In FIG. 3, a CPU 301 performs overall control of the broadcast receiver 300 in accordance with programs stored in a ROM 302.

A RAM 303 is a volatile memory, and is used as a work memory of the CPU 301. The RAM 303 is used also as a temporary storage area for various data. In particular, a 2D pixel shifting table is stored in a first memory area 304 and a 3D pixel shifting table is stored in a second memory area 305.

FIG. 4 is a conceptual diagram of the 2D pixel shifting table and the 3D pixel shifting table. Each table shows the display start position ([1,1], for example) of a video image corresponding to the number of occurrences (N=1, 2, 3, . . . ) of a burn-in mitigation trigger signal (to be described later with description of a display position control unit 311). In the example of FIG. 4, the 2D pixel shifting table is configured such that each time the trigger signal is generated, the display start position is shifted by one pixel in the x direction or the y direction (shift processing). Also, the 3D pixel shifting table is configured such that each time the trigger signal is generated, the display start position is shifted by one pixel in the x direction (horizontal direction) and by 2n pixels (where n is a natural number) in the y direction (vertical direction). That is, in order to perform pixel shifting on a 3D video image each frame of which contains a pair of the left eye image and the right eye image that alternate horizontal line by horizontal line, the images corresponding to the same scene, the display start position is shifted by 2n lines (where n is a natural number) in the vertical direction. Also, by shifting the image in accordance with a rule suitable for the video image format (whether the image is a 2D video image or a 3D video image), disruption in the video image can be suppressed.

Note that a computation expression for determining the display start position, for example, may be used instead of the table. Although the number of occurrences of the trigger signal in FIG. 4 is shown only up to the fourth time (N=4), actually, the pixel shifting table can also hold display start positions corresponding to the fifth trigger signal and subsequent trigger signals. However, when four trigger signals are treated as forming one cycle, it is sufficient if the pixel shifting table holds the display start positions corresponding to the four trigger signals.

A tuner unit 306 demodulates broadcast waves received via an antenna (not shown) and outputs video and audio baseband data. A demultiplexer unit 307 performs frame disassembly on the data received from the tuner unit 306 so as to separate video data, audio data and program information data.

The video data and the audio data separated by the demultiplexer unit 307 is input to a decoder unit 308. The decoder unit 308 decodes MPEG-2 coded video data and inputs the decoded data to a 3D video image generation unit 310. The decoder unit 308 also decodes MPEG-2 AAC-coded audio data to convert the audio data into a linear PCM format, and inputs the converted data to an audio processing unit 315.

The program information data separated by demultiplexer unit 307 is input to a video image determination unit 309. The program information data is transmitted in a data structure defined by the standard, "Service Information for Digital Broadcasting System", by the Association of Radio Industries and Businesses (ARIB), for example. Main constituent data of such a structure includes an SDT, which carries information regarding program channels, and an EIT, which carries information regarding a program such as the name or broadcast time of the program, the type of components to be transmitted, or the like. Note that SDT is an abbreviation of Service Description Table, and EIT is an abbreviation of Event Information Table.

With the present embodiment, the 3D video image format is additionally defined in the video image component type, which is currently standardized (component_type). Then, the video image determination unit 309 determines whether the format of the video data being decoded by the decoder unit 308 corresponds to two-dimensional video image (2D video image) or 3D video image, based on the component type included in the EIT, and notifies the 3D video image generation unit 310 of the determination result.

The 3D video image generation unit 310 performs processing to convert the video image input by the decoder unit 308 into a 3D video image if the video image format notified by the video image determination unit 309 indicates a 3D video image. Specifically, the 3D video image generation unit 310 processes a frame image constituting the video image input from the decoder unit 308, such that the left eye image is displayed in the odd numbered lines and the right eye image is displayed in the even numbered lines, as shown in FIG. 2, and inputs the frame image into a resolution conversion unit 313. In the case where the indicated video image format corresponds to a 2D video image, the 3D video image generation unit 310 inputs the video image input from the decoder unit 308 to the resolution conversion unit 313 without processing. In the embodiments of the present invention, a video image is defined as sequential display of a plurality of images in time series. Accordingly, resolution conversion and cutout processing based on the display position are not performed on the video image, but on the images forming the video image.

The display position control unit 311 determines, based on the determination result by the video image determination unit 309, a display region (prescribed region) in the image whose resolution has been converted by the resolution conversion unit 313 (described later). Then, the display position control unit 311 inputs to a video image processing unit 314 an image (partial image) cut out from the determined display region. Specifically, the display start position of the video image is determined by using the 2D pixel shifting table stored in the first memory area 304 in the case of the 2D video image, while using the 3D pixel shifting table stored in the second memory area 305 in the case of the 3D video image. If the image size of the video image is 1920×1080 for example, an image whose size is 1900×1070 is cut out starting from the display start position and the cutout image is input to the video image processing unit 314. Accordingly, pixel shifting can be understood as processing for shifting the region of the image cut out and output to the display panel 101 in accordance with the display start position. Of course, processing of merely shifting the display position without cutting out the image also corresponds to pixel shifting processing.

A frame number measurement unit 312 counts the number of frames output to the display panel, and sends the burn-in mitigation trigger signal to the display position control unit 311 when the count number has reached a prescribed number. The display position control unit 311, upon receipt of the burn-in mitigation trigger signal, updates the display start position based on the pixel shifting table according to the video image format.

Note that the condition for generating the burn-in mitigation trigger signal is not limited to the number of frames. For example, a trigger signal may be generated in the case where a change of channel is detected based on the above-described program information data, or in the case where the channel is changed in response to a user operation via a remote controller 317 or the like.

The resolution conversion unit 313 performs resolution conversion on the video image input from the 3D video image generation unit 310 so as to comply with the display panel 101. In this manner, a 2D video image or a 3D video image as a target for the pixel shifting processing is obtained. Therefore, the resolution conversion unit 313 can obtain a 2D video image or a 3D video image. The resolution conversion unit 313 sends a video image that has undergone resolution conversion to the display position control unit 311.

The video image processing unit 314 performs γ processing or the like on the image (partial image) input from the display position control unit 311, thereafter performs conversion into video image data complying with the display panel 101, such as an LVDS signal for example, and outputs the video image data.

The audio processing unit 315 performs digital-to-analog (D/A) conversion processing or the like on audio data, and outputs the converted audio data to a speaker 316. The remote controller 317 sends a control signal as an infrared signal in response to a user operation. The CPU 301 generates various commands, control signals or the like for controlling the broadcast receiver 300 from the infrared signal received by an infrared light receiving unit 318, and outputs the commands, control signals or the like.

Note that in the present embodiment, for the purpose of description, the left eye image is displayed in odd numbered lines of the display panel 101, while right eye image is displayed in the even numbered lines of the display panel 101 (see FIG. 2). However, the arrangement of the left eye image and the right eye image is not limited thereto, and for example, pixels for the left eye image and pixels for the right eye image may be arranged in a checkered pattern. In whatever form the left eye image and the right eye image are arranged, desired effects can be achieved by creating the pixel shifting table with which the pixels for a left eye image are shifted to the positions for other pixels for the left eye image, while the pixels for a right eye image are shifted to the positions of other pixels for the right eye image. In other words, the display position control unit 311 selects the portion to be displayed in the three-dimensional image for display that constitutes a 3D video image, namely, the region cut out as a partial image, such that the arrangement pattern of the left eye image and the right eye image of the 3D video image matches the arrangement pattern of the polarization filter 102. As a result, the image can be displayed as a 3D video image. Then, in the burn-in mitigation processing, the cutout position of the partial image is shifted such that the arrangement pattern of the left eye image and the right eye image does not change. Specifically, the cutout position is shifted such that the arrangement pattern of the left eye image and the right eye image matches the arrangement pattern of the polarization filter 102 even after shifting (changing) the cutout position. Note that shifting the cutout position is not essential to the present invention. In other words, processing of changing the display position of the display image itself is possible. Although a region where no image is displayed, namely, a blank region, appears in the display screen with such processing, displaying the display image constantly in the same position can be avoided, thereby mitigating burn-in.

FIG. 5 is a flowchart illustrating a burn-in mitigation processing performed by the broadcast receiver 300. Upon generation of the above-described burn-in mitigation trigger signal, the processing of this flowchart starts. In step S501, the video image determination unit 309 extracts the component type from the component descriptor in the EIT. In step S502, the video image determination unit 309 determines whether the format of the video data being decoded by the decoder unit 308 corresponds to the 2D video image or the 3D video image. The procedure proceeds to step S503 in the case of 2D video image, and to step S505 in the case of 3D video image.

In step S503, the display position control unit 311 reads out the 2D pixel shifting table from the RAM 303. In step S504, the display position control unit 311 acquires a corresponding display start position from the 2D pixel shifting table, based on the number of occurrences of the trigger signal (specifically, how many trigger signals have occurred up to the current processing of the flowchart).

Meanwhile, in step S505, the display position control unit 311 reads out the 3D pixel shifting table from the RAM 303.

Then in step S506, the display position control unit 311 acquires a corresponding display start position from the 3D pixel shifting table based on the number of occurrences of the trigger signal.

In step S507, the display position control unit 311 cuts out an image based on the display start position acquired in step S504 or S506, and inputs the image cutout into the video image processing unit 314.

Note that the format of the burn-in mitigation trigger signal may be defined such that the display position control unit 311 can acknowledge the cause of occurrence of the burn-in mitigation trigger signal. In this case, once the process for determining the format type of the video image (steps S501 and S502) is performed, unless the burn-in mitigation trigger signal is generated due to a cause that may accompany a change in the video image format (for example, a change of channel), this process can be omitted thereafter.

As described above, with the present embodiment, the broadcast receiver 300 shifts the region of the video image output on the display panel 101 in order to mitigate burn-in on the display panel 101. In the case where the video image is a 3D video image, the broadcast receiver 300 shifts the region such that the pixels for the left eye image are displayed in the positions of the pixels for the left eye image on the display panel 101, and the pixels for the right eye image are displayed in the positions of the pixels for the right eye image on the display panel 101. In this manner, a technique for mitigating burn-in for the 3D video image is provided.

Second Embodiment

Figure 6:
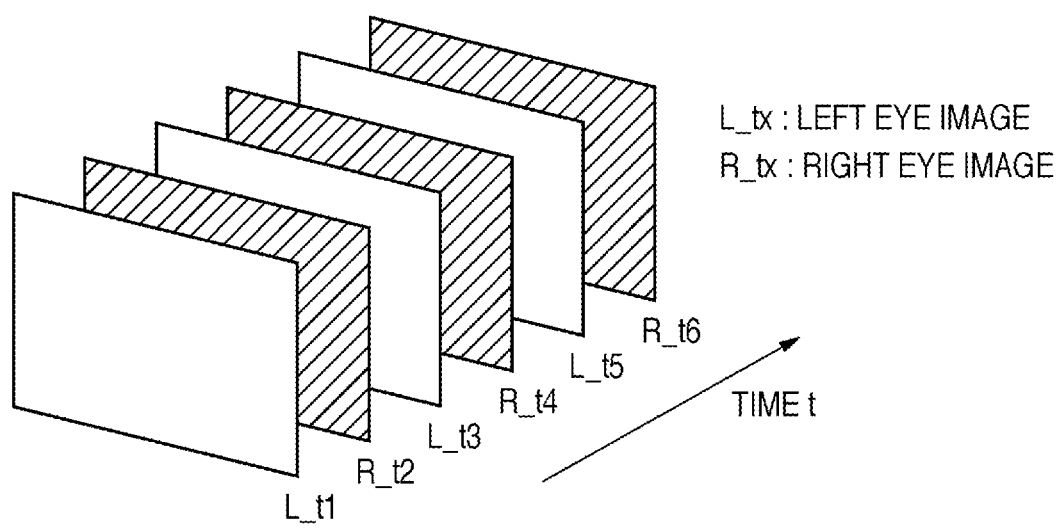
FIG. 6 is a conceptual diagram of 3D video image display by an active shutter method.

In a second embodiment, a case is described in which the active shutter method is employed as the method for displaying 3D video images. FIG. 6 is a conceptual diagram of 3D video image display by the active shutter method. As illustrated in FIG. 6, left eye images (L_t1, L_t3, . . . ) and right eye images (R_t2, R_t4, . . . ) are alternately displayed in time-series, and the parallax between both images causes a three-dimensional effect.

Figure 7:
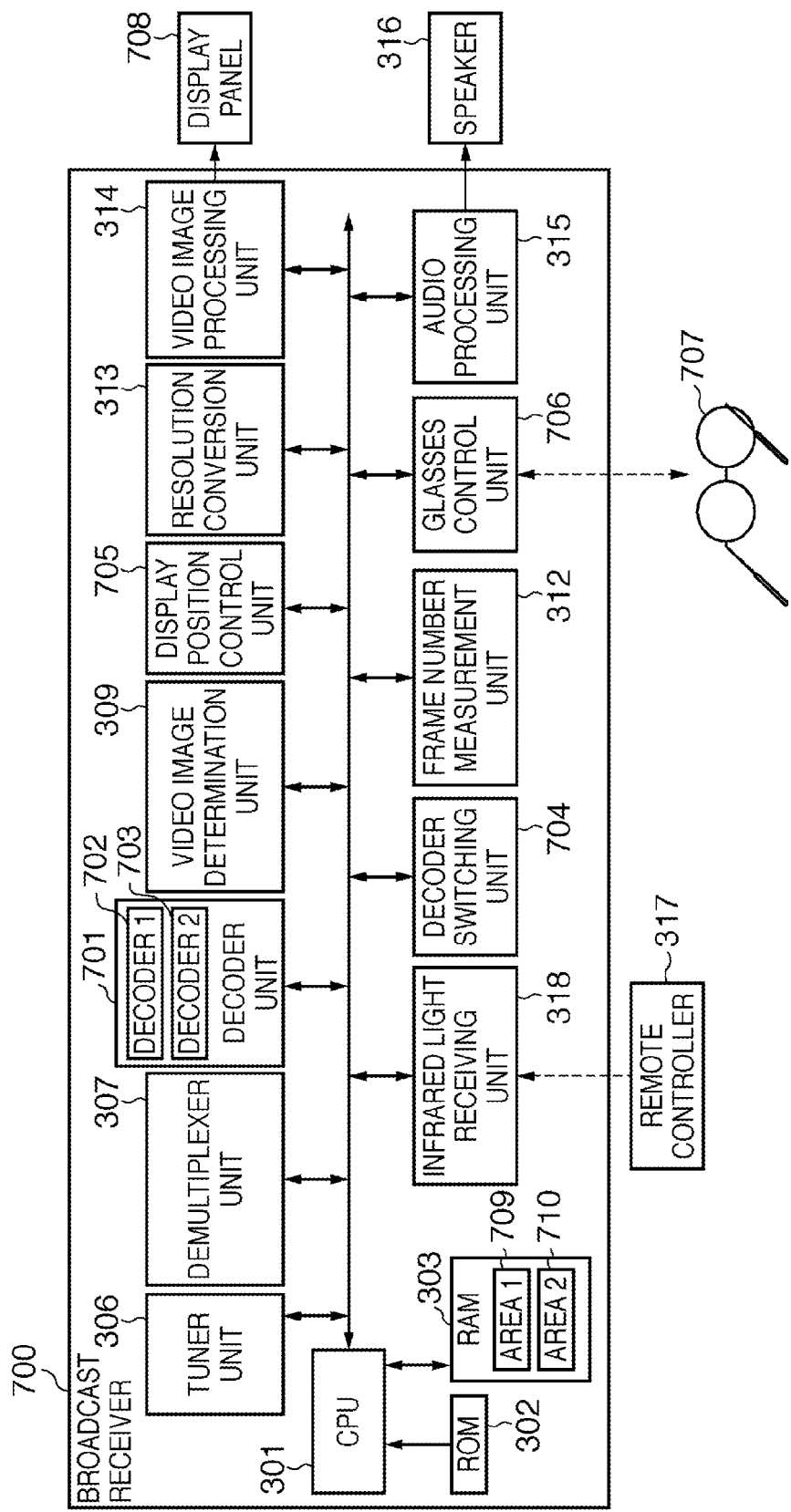
FIG. 7 is a block diagram showing a schematic configuration of a broadcast receiver 700 according to a second embodiment.

FIG. 7 is a block diagram showing a schematic configuration of a broadcast receiver 700 according to a second embodiment. In FIG. 7, constituent elements similar to those in the broadcast receiver 300 (FIG. 3) are assigned identical reference numerals, and their further description is omitted.

A decoder unit 701 includes a first decoder 702 that decodes left eye images and a second decoder 703 that decodes right eye images, and decodes MPEG-2 coded video data input from the demultiplexer unit 307 and inputs the decoded video data into a decoder switching unit 704. Also, the decoder unit 701 decodes MPEG-2 AAC-coded audio data to convert the audio data into a linear PCM format, and inputs the converted data to the audio processing unit 315.

The decoder switching unit 704 alternately inputs the left eye images and the right eye images input from the decoder unit 701 to the resolution conversion unit 313. Using two decoders in this manner enables display of video images at a higher frame rate.

A display position control unit 705 determines the region to be displayed of the image whose resolution has been converted by the resolution conversion unit 313, based on whether the image is the left eye image or the right eye image, and the determination result by the video image determination unit 309, and the partial image cut out from the determined display region is input into the video image processing unit 314. When determining the display region, the display position control unit 705 causes the display start positions for a pair of a left eye image and a right eye image to be matched.

If the video data is a 3D video image, a glasses control unit 706 controls the liquid crystal shutter of glasses 707 such that the left eye image only enters the left eye and the right eye image only enters the right eye in synchronization with the timing in which the left eye images and the right eye images are displayed in alternation.

A display panel 708 differs from the display panel 101 in the first embodiment, and does not include a polarization film. A first memory area 709 holds the 2D pixel shifting table and a second memory area 710 holds the 3D pixel shifting table. However, unlike the first embodiment, since the left eye image and the right eye image do not coexist in a single frame, design of the 3D pixel shifting table is not restricted by the arrangement of the polarization film.

Figure 8:
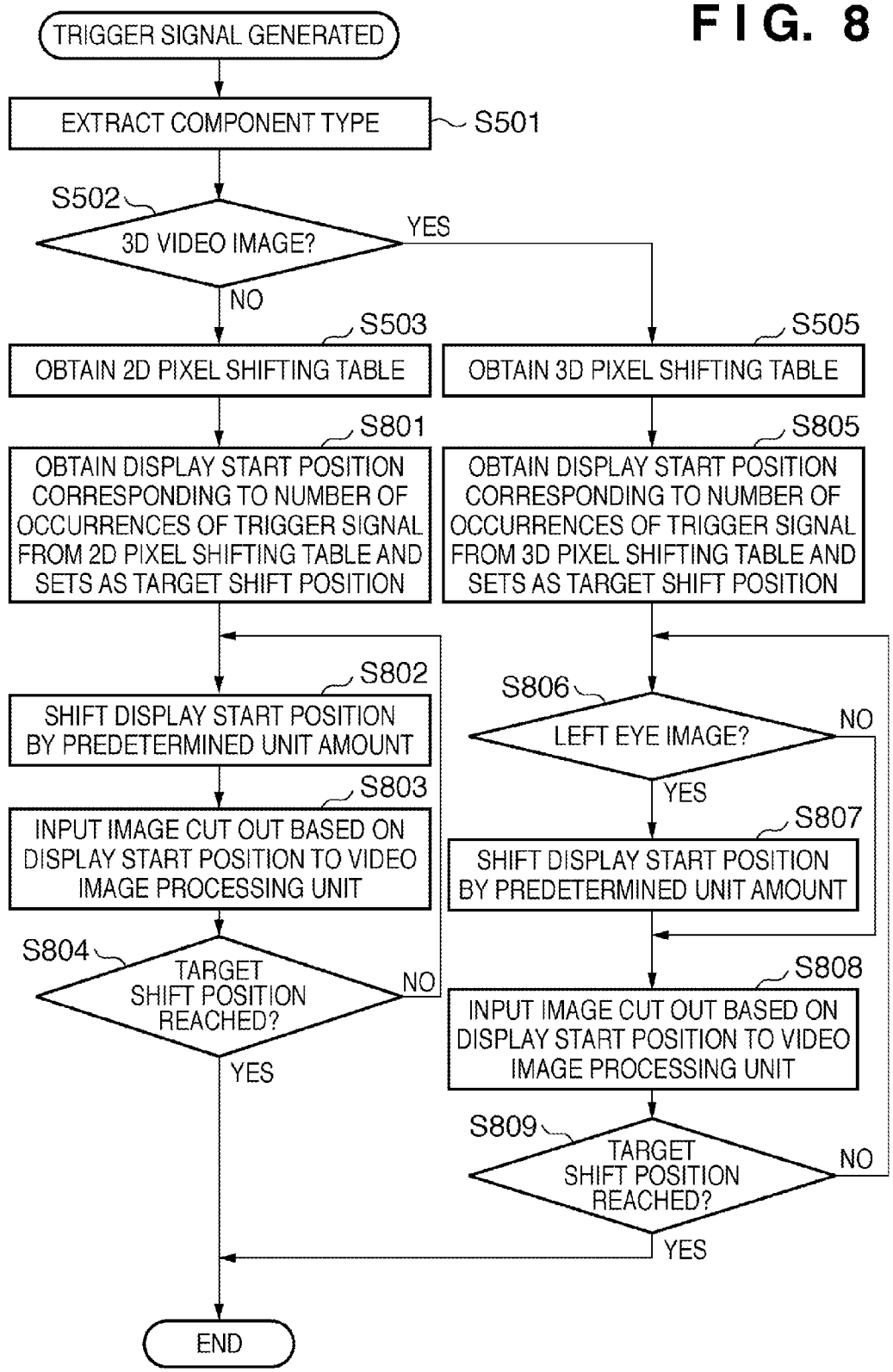
FIG. 8 is a flowchart illustrating burn-in mitigation processing by the broadcast receiver 700.

FIG. 8 is a flowchart illustrating burn-in mitigation processing by the broadcast receiver 700. In FIG. 8, steps where processes similar to those in the first embodiment (FIG. 5) are performed are assigned identical reference numerals, and description thereof is omitted. Upon generation of the burn-in mitigation trigger signal, the processing of this flowchart starts.

In the second embodiment, it is assumed that the pixel shifting table is configured such that the display start position is shifted by two pixels or more for a single trigger signal, for example, N={1, 2, ... }={[1,1], [7,1], ... }. In this case, if the display start position is shifted by the entire shift amount at once, when one frame is changed to the next frame, such shifting is noticeable to viewers, which may be perceived as a disruption in the video image. For this reason, with the present embodiment, the display position control unit 705 gradually shifts the display start position over several frames, from the display start position before the trigger signal is generated (e.g., [1, 1]) to the display start position after the trigger signal is generated (e.g., [7, 1]).

In step S801, the display position control unit 705 obtains a display start position corresponding to the number of occurrences of the trigger signal from the 2D pixel shifting table, and sets the position as a target shift position. In step S802, the display position control unit 705 shifts the display start position by a prescribed unit amount (e.g., one pixel). For example, if the display start position before shifting is [1, 1] and the target shift position is [7, 1], the display start position after shifting is [2, 1].

In step S803, the display position control unit 705 cuts out an image based on the display start position obtained after shifting in step S802, and inputs the image cutout to the video image processing unit 314. In step S804, the display position control unit 705 determines whether or not the display start position has reached the target shift position. If the target shift position is not reached, the procedure returns to step S802, and if the target shift position is reached, the processing ends.

Meanwhile, in step S805, the display position control unit 705 obtains the display start position corresponding to the number of occurrences of the trigger signal from the 3D pixel shifting table, and sets the position as the target shift position. In step S806, the display position control unit 705 determines whether or not a video image as the processing target is the left eye image. If the video image is the left eye image, the procedure proceeds to step S807, and if it is not the left eye image, the procedure proceeds to step S808.

In step S807, the display position control unit 705 shifts the display start position by a prescribed unit amount (e.g., one pixel). For example, if the display start position before shifting is [1, 1] and the target shift position is [5, 1], the display start position after shifting is [2, 1].

In step S808, the display position control unit 705 cuts out an image based on the display start position obtained after shifting in step S807, and inputs the image to the video image processing unit 314. In step S809, the display position control unit 705 determines whether or not the display start position has reached the target shift position. If the target shift position is not reached, the procedure returns to step S806, and if the target shift position is reached, processing ends.

As understood from steps S806 to S809, when the processing target video image is the right eye image, the display start position is not shifted, so the display start positions of a pair of the left eye image and the right eye image that correspond to the same scene match. As a result, the parallax does not change between the left eye image and right eye image that correspond to the same scene.

Figure 9:
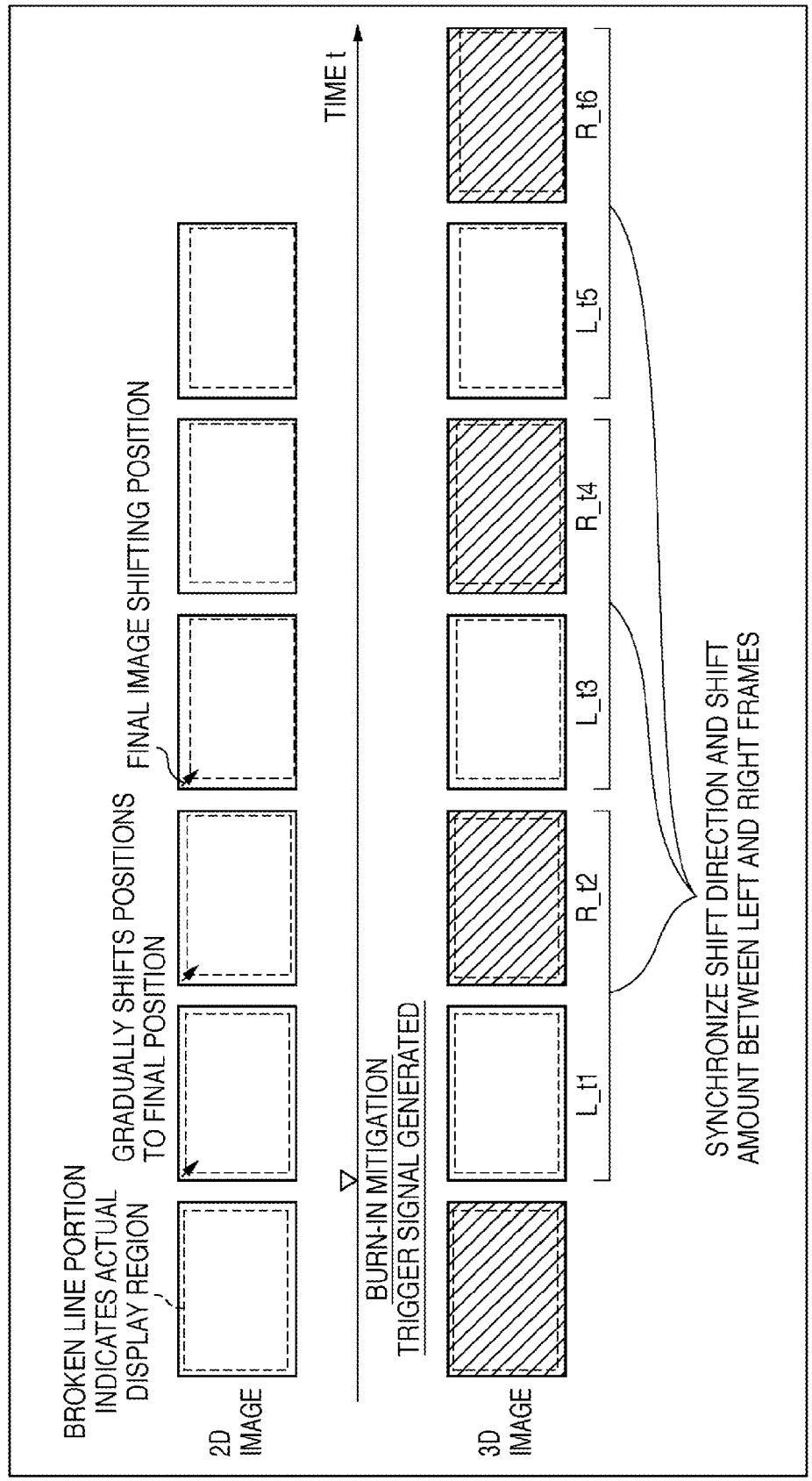
FIG. 9 is a conceptual diagram showing how a display start position is shifted according to the flowchart in FIG. 8.

FIG. 9 is a conceptual diagram showing how the display start position is shifted according to the flowchart in FIG. 8. As illustrated in FIG. 9, in the case of the 3D video image, the display start positions of a pair of the left eye image and the right eye image (e.g., L_t1 and R_t2) that correspond to the same scene match. In other words, the display start position is not shifted at a timing other than the timing with which a pair of left and right eye images that correspond to the same scene is switched to another pair of left and right eye images.

Note that setting the shift amount to 0 with respect to the coordinate values for the 3D pixel shifting table means stopping pixel shifting processing. If a motion vector between frames is determined to be large with the decoder unit 701, the motion of an object in the video image can be considered to be large. If pixel shifting is performed in this case, a significant disruption in the video image appears and the 3D effect is reduced. Accordingly, the decoder unit 701 divides a frame into a plurality of regions, references the motion vector for each region, and notifies the display position control unit 705 of the average motion amount of the object in the frame.

If the received average motion amount exceeds a prescribed threshold, the display position control unit 705 operates with replacing the shift amount to "0" with respect to the coordinate values in the 3D pixel shifting table, even in the case where the burn-in mitigation trigger signal is generated. As a result, a reduction of the 3D effect can be avoided. Note that in this case, since the motion of the object in the movie image itself is large, burn-in that may bring about an afterimage does not readily occur.

As described above, according to the present embodiment, the broadcast receiver 700 shifts the region of the video image to be output in the display panel 708 so as to mitigate burn-in on the display panel 708. In the case where the video image is a 3D video image, the broadcast receiver 700 shifts the region such that the display start positions of the left eye image and the right eye image corresponding to the same scene match. Accordingly, fluctuation in the parallax between the left eye image and the right eye image corresponding to the same scene is prevented. In this manner, a burn-in mitigation technique for 3D video images is provided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-134298, filed on Jun. 3, 2009, which is hereby incorporated by reference herein in its entirety.

The invention claimed is:

1. A video image processing apparatus that outputs a video image to a display device having a display region including a first display portion for displaying a left eye image and a second display portion for displaying a right eye image, comprising:
   a video image processing unit configured to cut out a partial image from frame images of a three-dimensional video image configured as an aggregate of the frame images for each scene, a single frame image being formed by arranging a pair of a left eye image and a right eye image corresponding to the same scene in a prescribed pattern; and
   an output unit configured to output the partial image cut out by the video image processing unit to the display device,
   wherein the video image processing unit, when changing a cutout position of the partial image, cuts out the partial image from the frame images such that an arrangement pattern of the left eye image and the right eye image in the partial image after the cutout position is changed matches an arrangement pattern of the first display portion and the second display portion in the display region.

2. The video image processing apparatus according to claim 1,
   wherein in the display region, the first display portion and the second display portion are provided on alternating horizontal lines, and
   the video image processing unit shifts the cutout position by 2n lines (where n is a natural number) in a vertical direction.

3. A video image processing apparatus that outputs a video image to a display device, comprising:
   a video image processing unit configured to cut out a partial image from a left eye frame image and a right eye frame image of a three-dimensional video image configured as an aggregate of left and right frame image sets for each scene, a single left and right frame image set being formed of a pair of a left eye frame image and a right eye frame image corresponding to the same scene, and
   an output unit configured to output the partial image cut out by the video image processing unit to the display device,
   wherein the video image processing unit executes processing for changing a cutout position of the partial image, and
   wherein the video image processing unit executes the processing for changing the cutout position at a timing in which, in the three-dimensional video image, a left and right frame image set corresponding to the same scene is switched to the next left and right frame image set.

4. The video image processing apparatus according to claim 3, wherein the video image processing unit, when changing the cutout position from a current cutout position to a target cutout position, the cutout position is shifted to the target cutout position in a stepwise manner by gradually shifting the cutout position over a plurality of left and right frame image sets.

5. A method for controlling a video image processing apparatus that outputs a video image to a display device having a display region including a first display portion for displaying a left eye image and a second display portion for displaying a right eye image, comprising:
   cutting out a partial image from frame images of a three-dimensional video image configured as an aggregate of the frame images for each scene, a single frame image being formed by arranging a pair of a left eye image and a right eye image corresponding to the same scene in a prescribed pattern; and
   outputting the partial image cut out in the cutting to the display device,
   wherein in the cutting, when changing a cutout position of the partial image, the partial image is cut out from the frame image such that an arrangement pattern of the left eye image and the right eye image in the partial image after the cutout position is changed matches an arrangement pattern of the first display portion and the second display portion in the display region.

6. The method according to claim 5,
   wherein, in the display region, the first display portion and the second display portion are provided on alternating horizontal lines, and
   in the cutting, the cutout position is shifted by 2n lines (where n is a natural number) in a vertical direction.

7. A method for controlling a video image processing apparatus that outputs a video image to a display device, comprising:
   cutting out a partial image from a left eye frame image and a right eye frame image of a three-dimensional video image configured as an aggregate of right and left frame image sets for each scene, a single right and left frame image set being formed of a pair of a left eye frame image and a right eye frame image corresponding to the same scene, and
   outputting the partial image cut out in the cutting to the display device,
   wherein in the cutting, processing for changing a cutout position of the partial image is executed, and
   wherein in the cutting, the processing for changing the cutout position is executed at a timing in which, in the three-dimensional video image, a left and right frame image set corresponding to the same scene is switched to the next left and right frame image set.

8. The method according to claim 7, wherein in the cutting, when changing the cutout position from a current cutout position to a target cutout position, the cutout position is shifted to the target cutout position in a stepwise manner by gradually shifting the cutout position over a plurality of left and right frame image sets.

9. The video image processing apparatus according to claim 1, further comprising:
   a determining unit configured to determine whether or not an input video image is the three-dimensional video image,
   wherein the video image processing unit cuts out the partial image from the frame images of the three-dimensional video image in a case where it is determined that the input video image is the three-dimensional image.

10. The video image processing apparatus according to claim 3, further comprising:
   a determining unit configured to determine whether or not an input video image is the three-dimensional video image,
   wherein the video image processing unit cuts out the partial image from the left eye frame image and the right eye frame image of the three-dimensional video image in a case where it is determined that the input video image is the three-dimensional image.

11. The video image processing apparatus according to claim 3, wherein the video image processing unit cuts out the partial image from the left eye frame image and the right eye frame image of the three-dimensional video image in a manner that a positional relationship between the left eye frame image and the right eye frame image does not change between before and after the cutting out.

12. The method according to claim 5, further comprising:
determining whether or not an input video image is the three-dimensional video image,
wherein the cutting cuts out the partial image from the frame images of the three-dimensional video image in a case where it is determined that the input video image is the three-dimensional image.

13. The method according to claim 7, further comprising:
determining whether or not an input video image is the three-dimensional video image,
wherein the cutting cuts out the partial image from the left eye frame image and the right eye frame image of the three-dimensional video image in a case where it is determined that the input video image is the three-dimensional image.

14. The method according to claim 7, wherein the cutting cuts out the partial image from the left eye frame image and the right eye frame image of the three-dimensional video image in a manner that a positional relationship between the left eye frame image and the right eye frame image does not change between before and after the cutting out.

* * * * *